Figure 16:
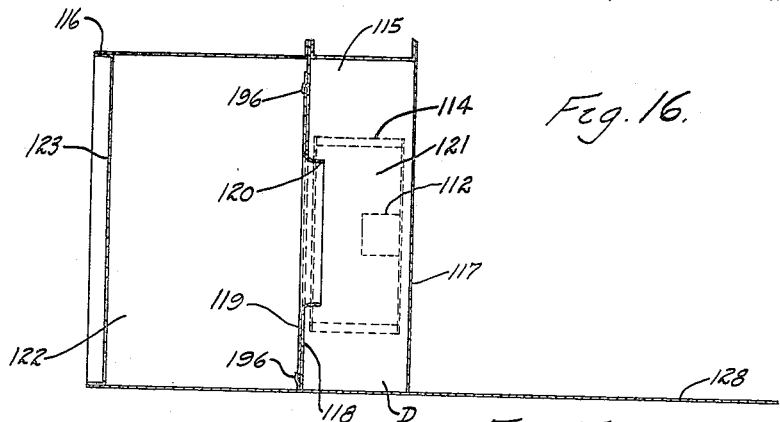

Oct. 9, 1934.  G. B. BRIGHT  1,976,431
AIR CONDITIONING UNIT
Filed Aug. 9, 1932  4 Sheets-Sheet 1
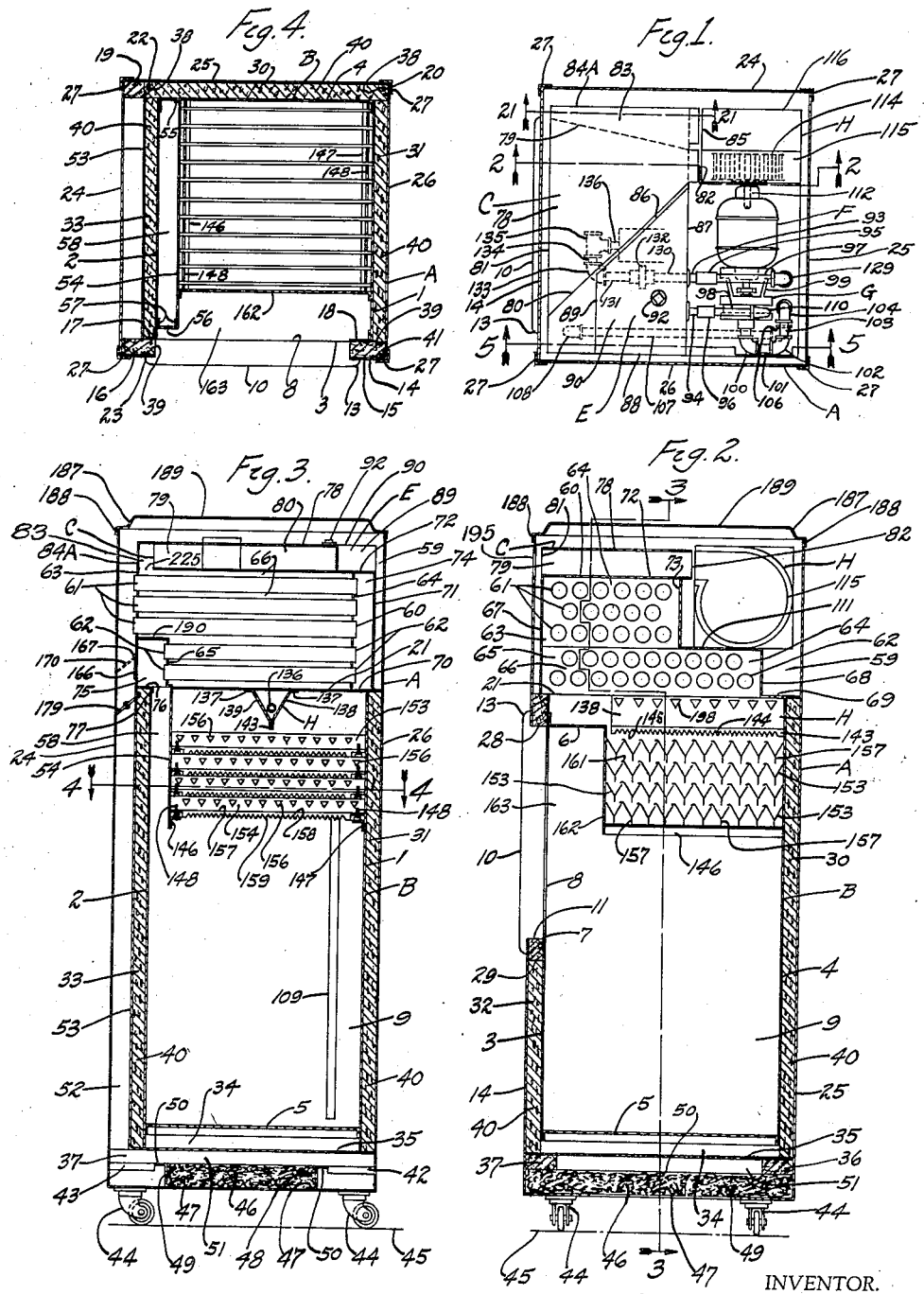
INVENTOR.
George B. Bright
BY George B. Ingersoll
ATTORNEY.

Oct. 9, 1934.  G. B. BRIGHT  1,976,431
AIR CONDITIONING UNIT
Filed Aug. 9, 1932  4 Sheets-Sheet 2
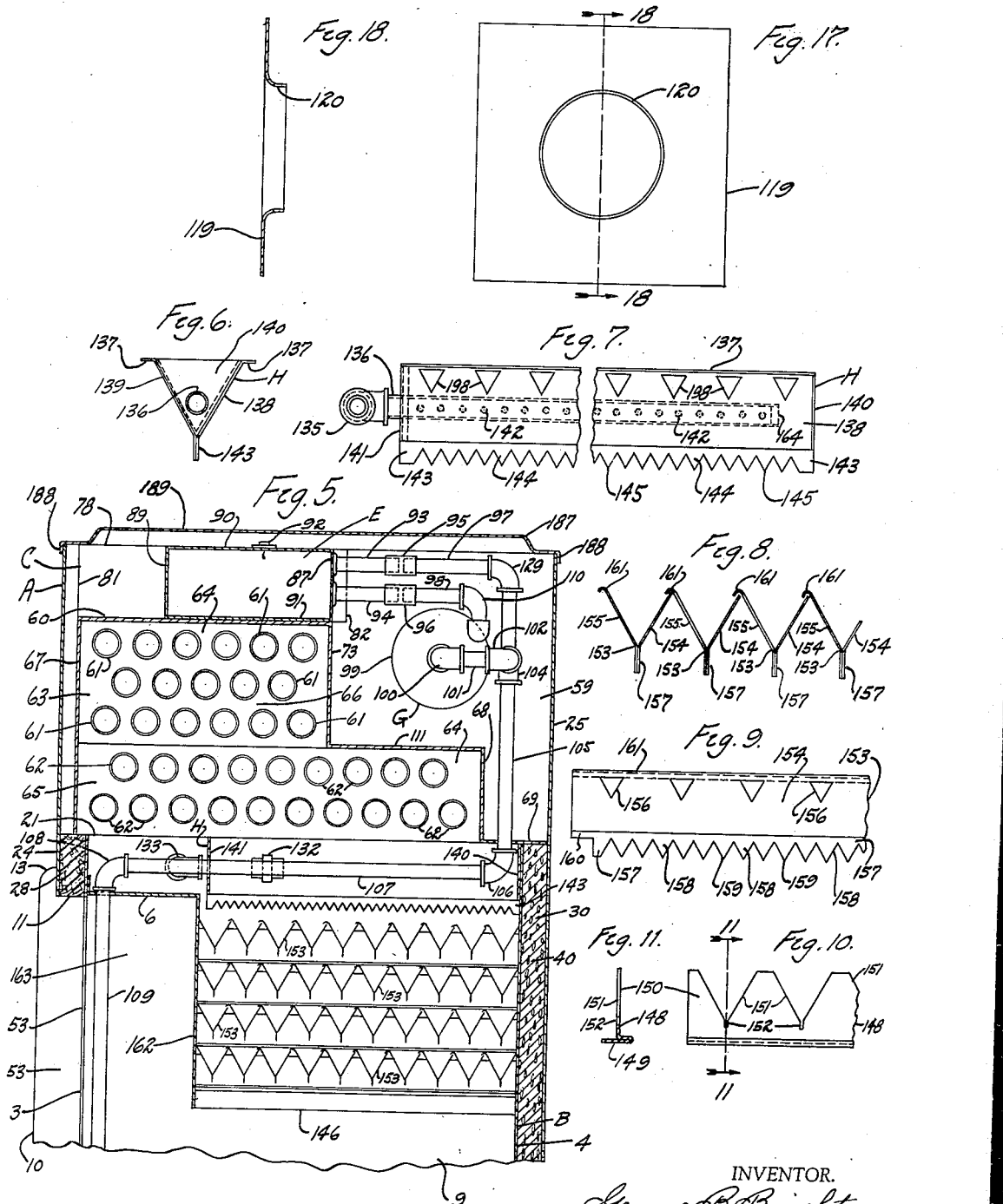

Oct. 9, 1934.  G. B. BRIGHT  1,976,431
AIR CONDITIONING UNIT
Filed Aug. 9, 1932  4 Sheets-Sheet 3
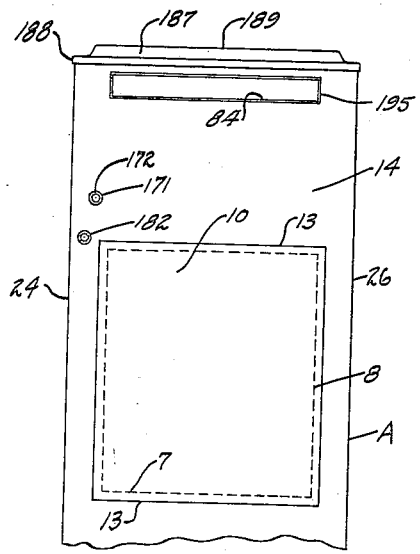
Fig. 12.
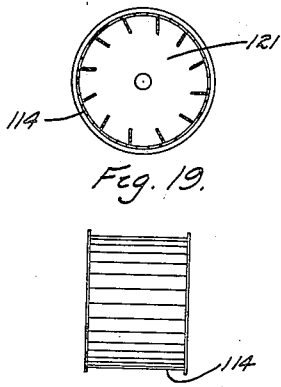
Fig. 19.
Fig. 20.
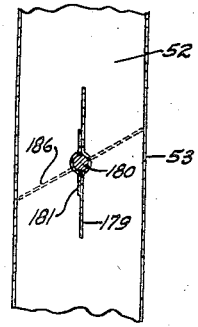
Fig. 25.
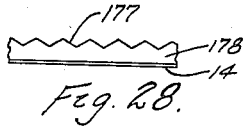
Fig. 28.
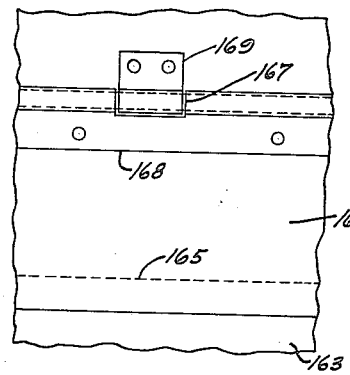
Fig. 24.  Fig. 23.
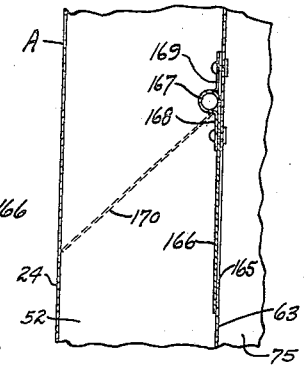
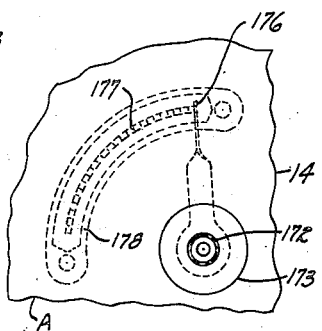
Fig. 27.
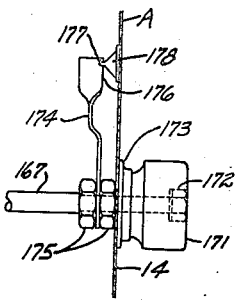
Fig. 26.
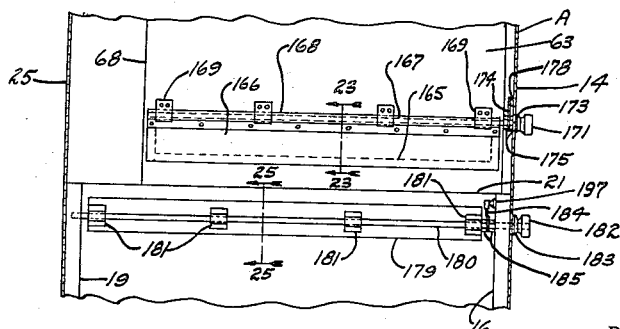
Fig. 22.
INVENTOR.
George B. Bright
BY
George B. Ingersoll
ATTORNEY.

Oct. 9, 1934.  G. B. BRIGHT  1,976,431
AIR CONDITIONING UNIT
Filed Aug. 9, 1932   4 Sheets-Sheet 4

INVENTOR.
George B. Bright,
BY George B. Ingersoll,
ATTORNEY.

Patented Oct. 9, 1934

1,976,431

UNITED STATES PATENT OFFICE 1,976,431

AIR CONDITIONING UNIT

George B. Bright, Detroit, Mich.

Application August 9, 1932, Serial No. 628,068

8 Claims. (Cl. 257—9)

My invention relates to improvements in units for household, office, and dwelling rooms in which air is conditioned; and the objects of my improvements are, first, to provide a unit for cleansing impurities from air passing through a cooling means; second, to provide an air conditioning unit capable of taking in its air from the cooler strata of air in a room; third, to provide an air conditioning unit having a lesser internal pressure than the pressure of the surrounding atmosphere; fourth, to provide an air conditioning unit having means for reducing the moisture content of the air passing therethrough; fifth, to provide an air conditioning unit having means for discharging air therefrom along a plane approximately parallel with the breathing area of the occupants of the room in which said unit is located; sixth, to provide an air conditioning unit capable of discharging air therefrom in an approximately horizontal plane at low velocities; seventh, to provide an air conditioning unit capable of condensing the moisture out of the air in a room with a minimum absorption of heat in the operation; eighth, to provide an air conditioning unit capable of discharging a large volume of air with a minimum of heat transfer through the walls or windows of the room in which said unit is located; ninth, to provide an air conditioning unit having means for heating dehumidified air by the heat of the ingoing air of the air conditioning unit; tenth, to provide an air conditioning unit having an exchanger adapted for the passage of the ingoing air and the outgoing air therethrough; eleventh, to provide means for dehumidifying air and raising the temperature of the air after dehumidifications; twelfth, to provide an air conditioning unit having means for controlling the volume and the temperature of the air issuing therefrom; thirteenth, to provide an air conditioning unit having a plurality of drip water troughs for washing and cooling the air; fourteenth, to provide an air conditioning unit having means for circulating water from its ice compartment through an air washing means; fifteenth, to provide an air conditioning unit having air dehumidifying means enclosed within an insulated chamber; and sixteenth, to provide an air conditioning unit having a circulating water system provided with a priming tank.

I attain these objects by the mechanism illustrated in the accompanying drawings, in which,—

Figure 15:
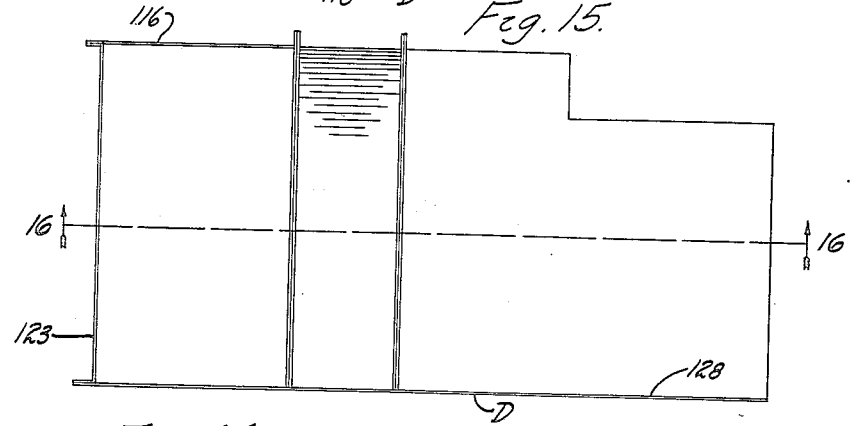
Figure 14:
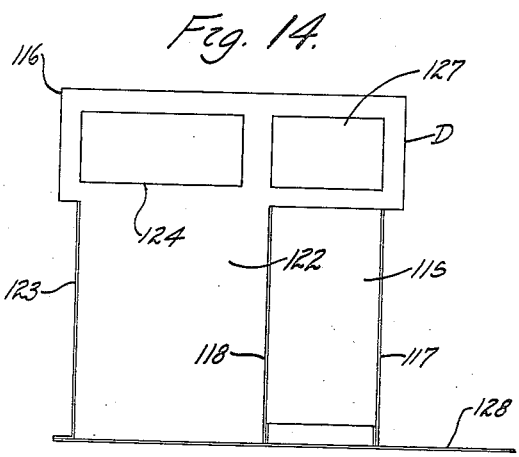
Figure 13:
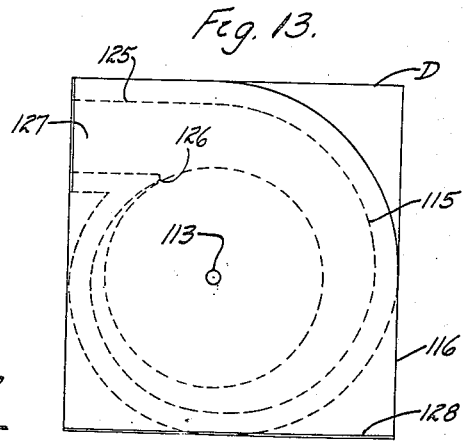
Figure 21:
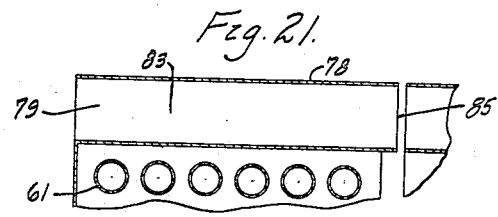

Figure 1 is a plan view of the air conditioning unit with its top cover removed; Fig. 2, a vertical section taken on the line 2—2, Fig. 1; Fig. 3, a sectional view taken on the line 3—3, Fig. 2; Fig. 4, a horizontal section taken on the line 4—4, Fig. 3; Fig. 5, a partial vertical section taken on the line 5—5, Fig. 1; Fig. 6, an end elevation of the water distributing trough; Fig. 7, a side elevation of the water distributing trough; Fig. 8, an end elevation of a portion of the drip troughs in their assembled position relative to one another; Fig. 9, a partial side elevation of one of the drip troughs; Fig. 10, a partial side elevation of one of the support members for the dip troughs; Fig. 11, a vertical section of one of the support members for the dip troughs, said vertical section being taken on the line 11—11, Fig. 10; Fig. 12, a partial front elevation of the air conditioning unit; Fig. 13, an end elevation of the blower housing; Fig. 14, a front elevation of the blower housing; Fig. 15, a plan elevation of the blower housing; Fig. 16, a sectional view of the blower housing taken on the line 16—16, Fig. 15; Fig. 17, a side elevation of the suction nozzle plate; Fig. 18, a sectional view of the suction nozzle plate taken on the line 18—18, Fig. 17; Fig. 19, a section view through the air impeller; Fig. 20, an elevation of the air impeller; Fig. 21, an enlarged section through the suction opening of the exchanger unit on the line 21—21, Fig. 1; Fig. 22, a side elevation of the temperature control and air volume control damper valves; Fig. 23, a half scale sectional view of the damper valve for controlling the temperature of the air, said sectional view being taken on the line 23—23, Fig. 22; Fig. 24, a half scale view of a portion of the temperature control damper valve with one of its hinges; Fig. 25, a half scale sectional view of the air volume control damper valve taken on the line 25—25, Fig. 22; Fig. 26, a half scale side elevation of the operating mechanism of said control valves; Fig. 27, an end elevation of a portion of the unit supporting said control valves; and Fig. 28, a developed view of one of the ratchet members.

Similar numerals refer to similar parts throughout the several views.

The cabinet A is provided with the tank member B which is constructed with the side walls 1 and 2 and the front wall 3 and the rear wall 4, together with the bottom wall 5 and the top wall 6. The tank member B is adapted for containing ice and water and is made water tight to prevent leakage of the water therefrom, thus being enabled to hold an accumulation of water which may extend as high as the lower edge 7 of the opening 8 in the front wall 3, the opening 8 being adapted to permit the replenishment of ice in the chamber 9 of the tank member B when the door 10 is removed, the door 10 being disclosed in its assembled position in Figs. 2 and 12. The door 10 is provided with the extension portion 11 which extends into the cabinet A, the door 10 being further provided with the flange 13 which contacts with the front outer surface 14 of the cabinet A.

The upright members 15 and 16 are located at the front corners of the cabinet A and may be located so as to contact with and be suitably attached to the angle irons 17 and 18 and thus locate the tank member B at its front side, the angle irons 17 and 18 being suitable attached to the tank member B, the upright member 15 extending to the bottom of the door 10.

The upright members 15 and 16 may be constructed of wood or other suitable material. The upright member 41 extends vertically from the upright member 15 to the wall member 35 hereinafter described. The upright members 19 and 20 are located at the rear corners of the cabinet A and may also be constructed of wood or other suitable material. It is to be noted that the upright members 15 and 16 extend upwardly to the line 21 which indicates the lower side of the exchanger unit 60 which is hereinafter disclosed in detail. The wall member 53 is suitably fastened to the inner sides of the upright members 16 and 19 and is further held in position by the triangular upright members 22 and 23.

The outer wall members 14, 24, 25, and 26 are suitably attached to the upright members 15, 16, 19, 20, 22, 23, and 41 and form the outer casing member of the cabinet A. The angle members 27 may be suitably attached to the corners of the cabinet A to reinforce and protect the corners thereof. The horizontal members 28 and 29 may be suitably attached between the members 15 and 16 to form a portion of the framework for the door 10.

It is to be noted that the spaces or chambers 30, 31, 32, and 33 will thus be formed between the outside walls of the tank member B and the outer walls 14, 25, and 26, as well as between the side wall 2 of the tank member B and the wall member 53. Also the tank members B will be so suspended that the space or chamber 34 between the bottom wall 5 of the tank member B and the wall member 35, which may be suitably attached to the outer wall members 14 and 25 and to the cross members 36 and 37 which may in turn be suitably attached to the outer wall members 14 and 25, the cross members 36 and 37 being constructed of wood or other suitable material, the space or chamber 34 forming an air space for insulating the chamber 9 from the warm or incoming air in the space 51 or, if desired, the space 34 may be filled with insulating material similar to that indicated at 40.

The spaces or chambers 30, 31, 32, 33 and 34 will be packed or filled with suitable insulation material which will thus render the tank member B to be insulated on its vertical and bottom sides from the outer casing walls of the container B. It is to be noted that by forming the upright members 20 and 22 with the inside angular surfaces 38 and the upright members 41 and 16 with the angular surfaces 39 that the insulation 40 may be extended continuously around the tank member B with the exception of that portion closed by the door 10.

The members 42 and 43, which also may be constructed of wood or other suitable material, are suitably attached to the cross members 36 and 37, the members 42 and 43 extending at right angles with the cross members 36 and 37.

The castors 44 are suitably attached to the members 42 and 43 and are located at the corner portions of the cabinet A and permit the cabinet A to be easily moved in a room or from one room to another in a dwelling, office, or other enclosures in which the cabinet A is used, the floor line on which the castors 44 rest being indicated at 45. The air is taken into the cabinet A through the air filter 46 which may be constructed as a unit filled with any suitable air filtering material, such as metal wool, hair, felt, etc., the air filter 46 being of sufficient length as to extend between and overlap the inside edges of the cross members 36 and 37, the air filter 46 being of such suitable shape as to be supported on the flanges 47 of the support members 48 and 49, the support members 48 and 49 being provided with the flanges 50 which are suitably attached to the cross members 36 and 37. It is to be noted that the air will be thus prevented from entering the cabinet A except through the air filter 46, the air passing into the space or chamber 51 which exists between the lower surface of the wall member 35 and the upper surface of the air filter 46, the space 51 communicating with the passage or chamber 52 which exists between the inner surface of the outer wall member 24 and the wall member 53, the passage 52 extending upwardly past the line 21 as hereinafter disclosed.

The tank member B is provided with the wall member 54 which extends from the rear wall 4, to which it is suitably attached by the flange 55, to a point adjacent the opening 8 in the wall member 3, the wall member 54 being suitably connected at said adjacent point, to the side wall 2, by the end wall member 56, which is provided with flanges 57 for suitable attachment to said wall members 54 and 2, the passage or chamber 58 thereby being formed between the wall members 2, 4, 54, and 56, said passage 58 being open at its upper and lower ends to connect the chamber 9 with the chamber 59 in which is located the exchanger unit 60.

The exchanger unit 60 comprises the two groups of tubular members 61 and 62, the tubular members 61 being of greater length than the tubular members 62, the ends of the tubular members 61 being suitably supported in the wall members 63 and 64 of the exchanger unit 60, the ends of the tubular members 62 being suitably supported in the wall members 64 and 65, the tubular members 61 and 62 extending through and slightly beyond the wall members 63, 64, and 65.

It is to be noted that the exchanger unit 60 will be open at the base of its compartment 66 through which the tubular members 61 and 62 extend, the open base portion of said exchanger unit being open at its base between the wall members 64 and 65 and between the wall members 67 and 68, the compartment 66 comprising a space which extends around and between each of said tubular members 61 and 62. The wall member 67 of the exchanger unit 60 rests on the upper surface of the horizontal member 28 and the exchanger unit 60 is further provided with the flange 69 which rests on the upper end walls of the tank member B and extends to the wall member 25 and closes the upper end of the space 30 for receiving the insulation 40.

The exchanger unit 60 is further provided with the wall portion 70 which extends from the wall member 64 to the wall member 71, which together with the upper wall member 72 and the wall members 73, 68, 64 and 67 form and enclose a space or chamber 74, the wall member 70 resting on the upper end of the tank member B along the line indicated at 21.

The exchanger unit 60 is further provided with the wall member 190 which extends between the wall members 65, 63, 67 and 68 and forms and encloses the space or chamber 75 which communicates with the passage 58. The wall member 63 is provided with the angular extension 76 which closes the upper end of the space 33 which receives the insulation 40, the angular extension 76 being further extended as at 77 to extend around the upper end of the wall member 2 and into the passage 58.

The discharge unit C is suitably attached to and assembled on top of the upper wall member 72 of the exchanger unit 60 and is provided with the upper wall member 78 and the vertical side wall members 79 and 80 which extend angularly from the outer or long side 81 of the discharge unit C to the inner or short side 82, the outer side 81 being provided with an opening 84 located adjacent the discharge opening 195 in the outer wall member 14 of the cabinet A, Fig. 12, the inner side 82 being open and adjacent the discharge opening 127 of the blower unit D hereinafter described, the inner side 82 extending slightly beyond the wall member 73 of the exchanger unit 60.

It is to be noted that the upper wall member 72 of the exchanger unit 60 is provided with an opening 225 as shown in Fig. 3, as indicated by the projected area of the space or chamber 83, Fig. 21, said opening 83 extending between the vertical wall members 79, 81, and 84A of the discharge unit C, said opening communicating with the compartment 66 of the exchanger unit 60 and with the space or chamber 83 enclosed by the vertical wall members 79, 81, and 84A and the upper wall member 78 of the discharge unit C, the space 83 terminating at its inner or large end in the air nozzle 85 which is provided with an opening located adjacent the blower unit D, the air nozzle 85 extending slightly beyond the wall member 73 of the exchanger unit 60.

The priming tank E comprises the vertical side wall members 86, 87, 88, and 89 together with upper and lower wall members 90 and 91, said priming tank E being suitably mounted on the exchanger unit 60 and adjacent the discharge unit C.

The priming tank E may be provided with the vented pipe plug 92 to prevent the priming tank E from becoming air bound and for inspection purposes, said priming tank E being further provided with the pipe nipples 93 and 94 to which may be attached the water hose connections 95 and 96 for connecting with the water pipes 97 and 98. The electric motor F is suitably attached to the housing 99 of the water pump G, the housing 99 being suitably connected with the elbow 100, the pipe 101, the elbow 102, the pipe 103, the elbow 104, the pipe 105, the elbow 106, the pipe 107, the elbow 108, and the pipe 109 which extends to a point adjacent the bottom wall 5 of the tank member 1.

It is to be noted that the water pump G is provided with the usual type of impeller (not shown) rotatably mounted within the housing 99 and adapted to draw water, by suction, from a point adjacent the lower end of the pipe 109 in the tank member 1, the housing 99 being provided with the outlet connection 110 which connects with the pipe 98.

The electric motor F will be partially supported by means of the water pump G being, in turn, supported by its attachment to the above mentioned pipes and elbows with which it is attached to the priming tank E. The electric motor F may be further supported by suitable brackets (not shown) attached to the wall member 111 of the exchanger unit 60, said wall member 111 extending from the wall member 68 to the wall member 73. The drive shaft 112 of the electric motor F, disclosed by dotted lines in Fig. 1, may be inserted through the hole 113, Fig. 13, of the blower unit H. The impeller 114 is suitably attached to and is supported on the drive shaft 112 of the electric motor F, the impeller being located within the impeller chamber 115 of the blower housing 116 as shown in Fig. 16. The blower housing 116 comprises the end wall 117 and the intermediate wall 118 which together with the circular wall portion of the impeller chamber 115 enclose the chamber in which the impeller 114 operates. The intermediate wall 118 is provided with an opening through which the impeller 114 may be assembled in operating position on the drive shaft 112, the opening in the intermediate wall 118 being partially closed by the suction nozzle plate 119, which is provided with the suction nozzle 120, which when the suction nozzle plate 119 is held in its assembled position by the clips 196, extends within the impeller 114. It is to be noted that the impeller 114 is provided with straight blades or vanes which extend parallel with the axis of the impeller 114. The impeller chamber 115 is constructed so that the air will be drawn into the annular space or chamber 121, within the impeller 114, through the suction nozzle 120 which communicates with the suction chamber 122 between the end wall 123 and the intermediate wall 118. The suction chamber 122 is provided with the suction opening 124. The impeller chamber 115 is so constructed that the air cannot be drawn therein by the impeller 114 except through the suction nozzle 120 and the annular chamber 121, the impeller 114 fitting closely adjacent the shoulder 126, see Fig. 13, the impeller chamber 115 gradually increasing in area until it connects with the passage 125 which terminates in the discharge opening 127, and as the air is sucked into the impeller 114, the rotary motion of the impeller 114 will centrifugally throw the air outwardly against the inside wall surface of the impeller chamber 115, the air being further impelled along the impeller chamber 115 and the passage 125 until it is discharged through the opening 127 which is located adjacent and in alignment with the opening in the inner side 82 of the discharge unit C. In a similar manner the suction opening 124 of the blower unit D is located adjacent and in alignment with the opening of the air intake 85 of the discharge unit C. The blower unit D may be suitably mounted on the wall member 111 of the exchanger unit 60, the blower unit D being provided with the attaching flange 128.

The pipe 97 is connected with the elbow 129, which in turn, is suitably connected with the pipes 130 and 131, the pipes 130 and 131 being connected by the coupling 132, the pipe 130 being connected with the elbow 133, the pipe 134, the three way valve 135, and the pipe 136. It is to be noted as shown in Fig. 5, that the pipe 105 and the lower pipe which is connected with the elbow 129 will extend through the wall portion 69 of the exchanger unit 60 while the suction pipe 109 will extend through the top wall 6 of the tank member 1.

The distributing trough H is a unit provided with the flanges 137 which are suitably attached to the under side of the exchanger unit 60, the distributing trough H being further provided with the side walls 138 and 139 which are assembled to form a V shaped trough whose ends are closed by the end walls 140 and 141. The pipe 136 extends through the end wall 141 and into the space or chamber enclosed by the side and end walls of the distributing trough H and is provided with a series of holes 142 through its walls, as disclosed in Fig. 7, which permit water carried by the pipe 136 to spill through the holes 142 into the distributor trough H, the pipe 136 being closed at its extreme end 164. The side walls 138 and 139 are provided with a series of triangular perforations or holes 198 which permit water to slowly trickle, in small quantities, through the lower V portion of the triangular perforations 198, and down the outer sides of the side walls 138 and 139 and the vertical flange 143, the vertical flange 143 being provided with a series of triangular openings therethrough which thus form a series of triangular serrations or teeth 144 which terminate, at their lower ends, at the points 145, which thus tend to allow the water flowing down the side walls 138 and 139 and the vertical flange 143, to drip slowly off of the points 145 in small drop like quantities. The angle members 146 and 147 are suitably and respectively attached to the wall members 54 and 1 of the tank member B. Upon the angle members 146 and 147 are placed the support members 148, which, as disclosed in Figs. 10 and 11 are provided with the horizontal flanges 149 for resting on the angle members 146 and 147 together with the vertical flange 150 which is further provided with the V shaped opening 151 therethrough, the lower portion of the V shaped openings 151 terminating in the slots 152. The drip troughs 153 are constructed with the side walls 154 and 155 forming a V shaped trough, in a similar way to that of the distributing trough H, the ends of the drip troughs 153 being located adjacent the wall members 54 and 1 of the tank member B. The side walls 154 and 155 of the drip troughs 153 are provided with a series of triangular perforations or holes 156 which also permit water to slowly trickle, in small quantities, through the lower V portion of the triangular perforations 156 and down the outer sides of the walls 154 and 155, the vertical flanges 157, of the drip troughs 153, being provided with a series of triangular openings therethrough which thus form a series of triangular serrations or teeth 158 which terminate, at their lower ends, at the points 159, which thus tend to allow the water flowing down the side walls 154 and 155 and the vertical flanges 157, to drip slowly off the points 159 in small drop like quantities. The vertical flanges 157 of the drip troughs 153 are cut away at each of their ends to provide the short portion of vertical flange 160 which fits within the slot 152 of the support members 148. The side walls 155 of the drip troughs 153 are provided with the curved portions 161 which fit over the upper edges of the side walls 154 of each adjacent drip trough 153 and prevents the water from passing through between the upper ends of the side walls 154 and 155.

It is to be noted that the distributing trough H will extend for a portion of the length only of the exchanger unit 60 and that the drip troughs 153 will be assembled at right angles to the longitudinal plane of the distributing trough H, a series of support members 148 and drip troughs 153 being alternately supported one upon another, the upper drip troughs 153 being immediately below the distributing trough H. Also the wall member 162, of the tank member B, which together with the wall members 54, 4, and 1 enclose the drip troughs 153, is set back from the front wall 3, to provide the space 163 opposite the opening 8 to facilitate the placing of ice in the tank member B. Also it is to be noted that the triangular perforations 156 of the drip troughs 153 and the triangular perforations 143 of the distributing trough H are located at their upper portions to permit a quantity of water to build up in the V portions of each of the drip troughs 153 and the distributing trough H.

The wall member 63 of the exchanger unit 60 is provided with the opening 165 which communicates with the passage 52 and the chamber 75. The damper valve 166 is of sufficient area to cover and close the opening 165 when in its closed position as disclosed in Fig. 23. The damper valve 166 is suitably connected with the hinge rod 167 by the hinge member 168 which is riveted or otherwise suitably attached to the damper valve 166. The hinge rod 167 is supported in the hinge member 159 which is riveted or otherwise suitably attached to the wall member 63. The damper valve 166 can be moved to the position, as indicated by the dotted lines at 170, Fig. 23, in which the end of the damper valve 166 touches the wall member 24 thus closing the passage 52 and causing any air, flowing upwardly through to the passage 52, to pass through the opening 165 into the chamber 75. The opening and closing movement of the damper valve 166 is accomplished by the knob or handle 171 which is suitably attached to the hinge rod 167 by means of the nut 172, the ringe rod extending through the wall member 14 thus allowing the knob 171 to be placed on the outside of the cabinet A as disclosed in Fig. 12.

The ferrule 173 may be suitably mounted between the knob 171 and the wall member 14. In order to permit the damper valve 166 to be adjustably moved to any desired position between its opening and closed position to thus control the amount of air passing from the passage 52 into the chamber 75, the resilient arm 174 is secured to the hinge rod 167 by the nuts 175, the resilient arm being adapted to move with the hinge rod 167 and have its edge surface 176 engage the serrations 177 of the ratchet member 178 which is suitably attached to the wall member 14.

In a similar way the damper valve 179 is secured to the rod 180 by means of the clips 181, the rod 180 being rotatably mounted in the members 16 and 19, the rod 180 extending through the member 16 and the wall member 14 to permit the knob or handle 182 to be located on the outside of the cabinet B as disclosed in Fig. 12. The knob 182 may be suitably attached to the hinge rod 180 and turn against the ferrule 183 which may be suitably attached to the wall member 14.

A resilient arm 184 may also be secured to the hinge rod 180 by the nuts 185, the resilient arm 184 engaging the ratchet member 197 in the manner as described relative to the resilient arm 174 and the ratchet member 178, the damper valve 179 thus being permitted to be adjustably moved from its fully open position, as disclosed by the full lines in Fig. 25, to its fully closed position as indicated by the dotted lines 186 in Fig. 25, or said valve 179 may be set and held, by the resilient arm 184 and ratchet member 196, in any intermediate position, to control the amount of air being sucked through the passage 52.

The cover member 187 is provided with the flanges 188 which fit loosely over the upper ends of the wall members 14, 24, 25, and 26 thus permitting the cover member 187 to be readily removed for inspection of the units within the cabinet A. Also the top wall portion 189 of the cover member 187 may be perforated with a series of openings therethrough to provide ventilation for the chamber 59.

The operation of the air conditioning unit is as follows; the operation of the electric motor F, which may be connected in the usual way to an outside source of electrical power, such connections not being shown, will cause the water pump G to draw water from a position at the lower end of pipe 109 in the ice chamber 9, which will contain ice in sufficient quantities to insure a supply of ice water therein due to the melting of the ice, the water being sucked upwardly, by the operation of the water pump G, through the pipes and elbows which connect the pipe 109 with the housing 99 of the water pump G, the water being discharged from the housing 99 through the pipes 94 and 98, together with their connective parts, into the priming tank E from whence it will be discharged, by the further pressure developed therein by the flow of water through the water pump G, through the pipe 93, and through the various pipes and elbows connecting therewith to the pipe 136, from whence it will spill out through the holes 142 as above disclosed, the water filling the distributing trough H with a well of water until the water overflows through the triangular openings 143, the water flowing down the outside walls and dropping off the pointed ends 145 of the distributing trough H as above disclosed, the water further dripping into the upper drip trough 153 where it fills said drip trough with a well of water built up to the lower level of the triangular perforations 156, the water successively flowing out and down the outside walls and off the points 159 of the series of drip troughs until it finally falls into the chamber 9 of the tank member 1. The priming tank E may be initially filled with water when necessary to prime the water pump G, by removing the pipe plug 92.

When the electric motor is operated, as above stated, the impeller 114 will revolve and suck in air through the air filter 46, the air filter removing the impurities from the air, the air passing through the air filter 46, the chamber 51, the passage 52, past the valve 179, through the tubular members 61 into the chamber 74, from the chamber 74 through the tubular members 62 to the chamber 75, thence through the passage 58 to the chamber 9, from whence it passes upwardly through the perforations of the various drip troughs 153, the air flowing counter-current wise to the dripping water, the staggering of the drip troughs 153 providing a tortuous and devious route in which the air will be washed and cleansed by the dripping water, the air being further cooled and dehumidified as it passes through the drip troughs 153. As the air passes upwardly through the drip troughs, as above described, the air passes out of the open upper end of the tank member 1 and into the compartment 66 of the exchanger unit 60, the air passing between and around the outside of the tubular members 61 and 62, the air being heated by contact with the outside of the tubular members 61 and 62 through which is passing air, of higher temperature, as drawn into the cabinet A from the room in which said cabinet A is being used, the air, after being heated, as above described, passing into the space 83 of the discharge unit C, from where it passes through the air intake 85 into the suction chamber 122 of the blower housing H, the air passing from the suction chamber 122 through the suction nozzle 120 into the annular chamber 121 of the impeller 114 from which it is expelled outwardly through the impeller chamber 115 and the passage 125, through the discharge opening 127 and through the opening in the inner side 82 of the discharge unit C from which it is discharged through the opening 84A of the discharge unit C and thus through the discharge opening 195 in the outer wall member 14 of the cabinet A. The cabinet A may be of sufficient height to permit the discharge opening 195 to be approximately six foot above the floor line, thus providing a unit which will take in its air through its bottom near the floor, thus drawing in the coolest air in the room, and recirculating the air into the room above the breathing line of the ordinary person.

It is to be noted that in my invention the exchanger unit 60 is chiefly used to reheat the air passing to the discharge outlet instead of cooling or dehumidifying the air, the air being cooled and dehumidified by the passage through the drip troughs and the ice cold water passing therethrough.

Also the use of the exchanger unit 60 eliminates moisture deposits at the air discharge outlet of the cabinet A.

It is to be further noted that in my invention the cooling and dehumidifying of the air is accomplished on the inside of an insulated tank member which eliminates any difficulty of leakage of water by sweating and of all of the usual difficulties due to sweating in uninsulated designs. It is also to be noted that my invention may be used as a wet type of air conditioning unit as herein disclosed or it may be used as a dry type by removal of the water pump and drip troughs and by substituting the conventional type of ice fin members as used in air conditioning units in which the ice fin members are used for the passing of air therethrough without the passing of the air through dripping or falling water. Also my invention is readily adapted for use with a mechanical refrigerating mechanism instead of ice.

The amount of air circulated may be regulated as above described by the damper valve 179. Also the temperature of the circulated air may be controlled by the damper valve 166 which permits the air to be passed directly through the drip troughs, without passing through the tubular members of the exchanger unit 60, in which case the air does not give up any of its heat to the outgoing air which has been cooled and is passing between and around the outside surfaces of the tubular members 61 and 62 in the compartment 66 of the exchanger unit 60. Thus with the damper valve 166 in its fully opened position, as indicated by the dotted lines 170 in Figs. 23 and 3, in which the passage 52 is closed by said damper valve 166, the air will pass through the drip troughs 153 in a warmer condition than otherwise with the result that the air circulated into the room will be of a higher temperature than when the air is also passed through the exchanger unit 60 on its way to the drip troughs 153.

Also the temperature of the water on the drip troughs 153 may be regulated by means of a by pass valve (not shown) installed in the water circuit pipe line, said by pass valve being used to regulate the quantity of water flowing over the drip troughs 153.

It is to be further noted that my invention will cool the incoming air to very low temperatures due to passing the air through the exchanger unit 60 on its way to the drip troughs 153, the very low temperatures being necessary to dehumidify the air and dehumidifying is necessary to obtain proper air temperatures for optimum comfort. As there can be no dehumidifying until the dew point has been reached, the dew point being that at which the moisture in the air will condense, very low temperatures must necessarily be obtained in a successful air conditioning process. Then to obtain optimum comfort the air, as discharged at the breathing level, must be reheated to bring it back into the comfort zones of temperature, this being accomplished in my invention as above disclosed.

It is to be further noted that the horizontally extending blades of the impeller 114 will circulate the air outwardly through the various discharge passages and the discharge opening 195 of the cabinet A without the tendency to create eddys and cross currents as would be the case if the blades of the impeller 114 were constructed with a pitch, the air being discharged from the opening 195 in approximately a horizontal plane which will thus be injected into the atmosphere of a room with the least disturbance of the air therein and with a greater degree of comfort to the inhabitants of the room.

I claim:

1. In an air conditioning unit, the combination of an insulated tank, an exchanger unit above said insulated tank, said exchanger unit comprising tubular members, a trough member for distributing water, said trough member being located below said exchanger unit, a plurality of trough members one above another, said last mentioned trough members being located below said first mentioned trough member, each of said last mentioned trough members being provided with perforations for distributing water, a priming tank, means for pumping water from said insulated tank to said priming tank, means for conveying water from said priming tank to said first mentioned trough member, and means for sucking air, from outside of the air conditioning unit, through the tubular members of said exchanger unit, said insulated tank, said plurality of trough members, and again through said exchanger unit between its tubular members, said last mentioned means further forcing the air outwardly from the air conditioning unit.

2. In an air conditioning unit, the combination of heat insulated tank, means for cooling the air, said means being located in said heat insulated tank, an exchanger unit comprising tubular members, said exchanger unit being mounted on said heat insulated tank and above said means for cooling the air, a discharge unit suitably mounted on said exchanger unit, and means for drawing air into said exchanger unit through a portion of said tubular members, said means further guiding and drawing the air through the remainder of said tubular members into said heat insulated tank, said means further guiding and drawing the air between said tubular members, said means further drawing and guiding the air into said discharge unit, said means further discharging the air from discharge unit.

3. In an air conditioning unit, the combination of an exchanger unit comprising a plurality of tubular members suitably mounted therein, said exchanger further comprising a chamber connecting with all of said plurality of tubular members, said exchanger unit further comprising a chamber connecting with a portion of said plurality of tubular members, said exchanger unit being further provided with openings oppositely disposed to permit air to be drawn therethrough between said tubular members in a transverse direction relative to the axes of said tubular members, means for cooling the air, and means for circulating air through said exchanger unit, said air passing through a portion of said tubular members to said first mentioned chamber, through a portion of said tubular members to said second mentioned chamber, through said cooling means, and through said openings oppositely disposed in said exchanger unit to permit the passage of the air between said tubular members in a transverse direction relative to the axes of said tubular members.

4. In an air conditioning unit, the combination of a tank member having an open end, an exchanger unit suitably mounted at the open end of said tank member, air cooling means suitably mounted in said tank member, a second tank member enclosing said first mentioned tank member and said exchanger unit, said tank members forming a passage for incoming air at one side of the air conditioning unit, said passage extending for the total length of said first mentioned tank member and said exchanger unit, means for guiding air to flow from said passage through said exchanger unit and said cooling means and then again through said exchanger unit, and means for guiding the air to flow from said exchanger unit to the outside of the air conditioning unit.

5. In an air conditioning unit, the combination of a plurality of tubular members suitably mounted, a pair of chambers located at opposite ends of and connecting with said tubular members, a third chamber located between the ends of a portion of said tubular members and one of said first mentioned chambers, and an air cooling means suitably mounted, means for inducing a flow of air, means for guiding the flow of air through all of said plurality of tubular members and all of said chambers to said air cooling means, and means for guiding the flow of air from said air cooling means between said plurality of tubular members to the outside of the air conditioning unit.

6. In an air conditioning unit, the combination of an inner tank member having an open end, an exchanger unit suitably mounted at the open end of said inner tank member, a second tank member enclosing said inner tank member and said exchanger unit and providing an air passage extending adjacent said exchanger unit and said inner tank member, means for washing the air, said means being suitably mounted in said inner tank member and adjacent said exchanger unit and providing an air passage extending substantially parallel with said first mentioned air passage, a chamber forming a connecting passage between said first and said second mentioned air passages, and means for inducing a flow of air through said passages, said means for washing the air, and said exchanger unit.

7. In an air conditioning unit, the combination of an exchanger unit comprising a plurality of tubular members connected with a pair of chambers, one of said chambers being connected with a portion only of said tubular members, said exchanger unit being further provided with a passage therethrough and extending transversely to the axes of said tubular members, a tank member adjacent said exchanger unit, means for drawing air through said tubular members and through said pair of chambers into said tank member, and valve means suitably mounted in the wall of one of the pair of chambers of said exchanger unit to cause the air to be conducted into one of the chambers of said exchanger unit and into said tank member without passing through the inside of the tubular members of said exchanger unit.

8. In an air conditioning unit comprising an intake passage, the combination of an exchanger unit comprising a pair of chambers together with tubular members connecting with said pair of chambers, said exchanger unit further comprising tubular members connected with one only of said pair of chambers and with the intake passage of the air conditioning unit, said exchanger unit being further provided with a valve opening connecting with one of said pair of chambers, and valve means suitably mounted to open and close said valve opening connecting with one of said pair of chambers, said valve means being further adapted to close the intake passage of the air conditioning unit.

GEORGE B. BRIGHT.